US006494650B2

(12) United States Patent
Maecker

(10) Patent No.: US 6,494,650 B2
(45) Date of Patent: Dec. 17, 2002

(54) LEVERAGE ACCESSORY FOR POWER DRILLS

(76) Inventor: William A. Maecker, 133 Central Ave., Apartment One, Silver Creek, NY (US) 14136

( * ) Notice: Subject to any disclaimer, the term of this patent is extended or adjusted under 35 U.S.C. 154(b) by 112 days.

(21) Appl. No.: 09/775,781

(22) Filed: Feb. 2, 2001

(65) Prior Publication Data

US 2001/0038776 A1 Nov. 8, 2001

Related U.S. Application Data

(60) Provisional application No. 60/179,673, filed on Feb. 2, 2000.

(51) Int. Cl.[7] ........................................ B23D 45/00

(52) U.S. Cl. ........................................ 408/136; 408/129

(58) Field of Search ........................................ 408/111, 129, 408/136, 712

(56) References Cited

U.S. PATENT DOCUMENTS

| | | | | | |
|---|---|---|---|---|---|
| 2,472,270 | A | * | 6/1949 | Stinchcomb | 408/136 |
| 2,625,063 | A | * | 1/1953 | Hanson | 408/712 |
| 2,709,380 | A | * | 5/1955 | Reynolds | 408/712 |
| 3,552,239 | A | * | 1/1971 | Yeaman et al. | 408/103 |
| 3,834,828 | A | * | 9/1974 | Kikuchi | 408/712 |
| 4,136,579 | A | * | 1/1979 | Robinson et al. | 173/36 |
| 5,348,428 | A | * | 9/1994 | Turner | 408/111 |
| 5,785,467 | A | * | 7/1998 | Gardner | 408/136 |
| 5,863,158 | A | * | 1/1999 | Foshee et al. | 408/136 |

FOREIGN PATENT DOCUMENTS

| | | | | |
|---|---|---|---|---|
| DE | 392739 | * | 3/1924 | 408/136 |
| SU | 1526926 A1 | * | 12/1989 | 408/136 |

* cited by examiner

*Primary Examiner*—Daniel W. Howell

(57) ABSTRACT

A leverage accessory for hand-held power drills comprises a lever (10) having a handle (14) at one end and a sharp pointed tip (12) at the other end for plunging (10W) into sheathing (16) attached to the stud or joist (24) being drilled. An instantly repositionable, non-slip contact section (38) connects the lever (10) to the drill body (20) to apply force to the central axis of the drill bit (22). The device can be adapted to existing drill motors (20), and may be made integral to drill motor/lever units (68).

3 Claims, 7 Drawing Sheets

Fig.3A
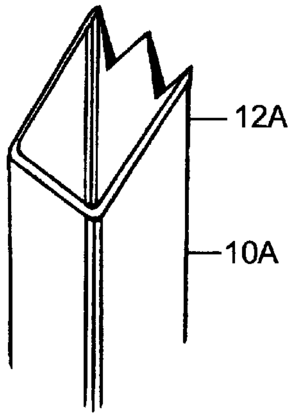
Fig.3B
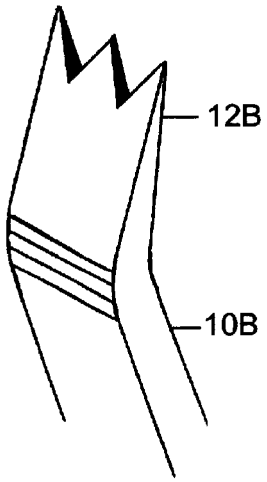
Fig.3C
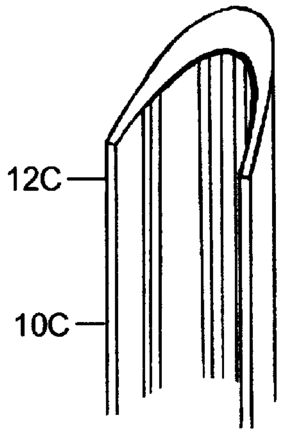
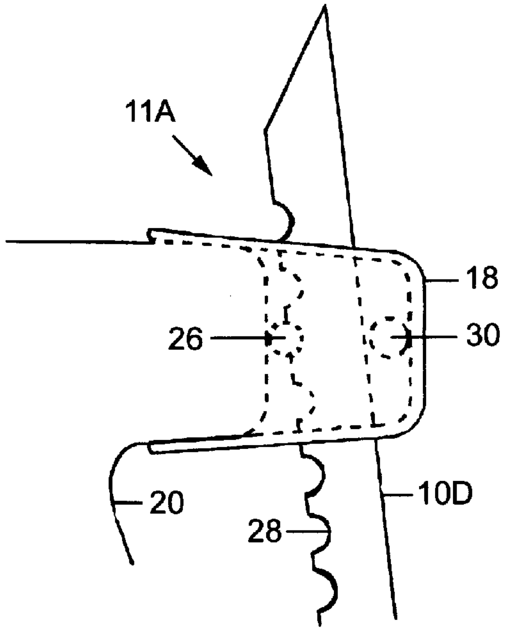
Fig.4A
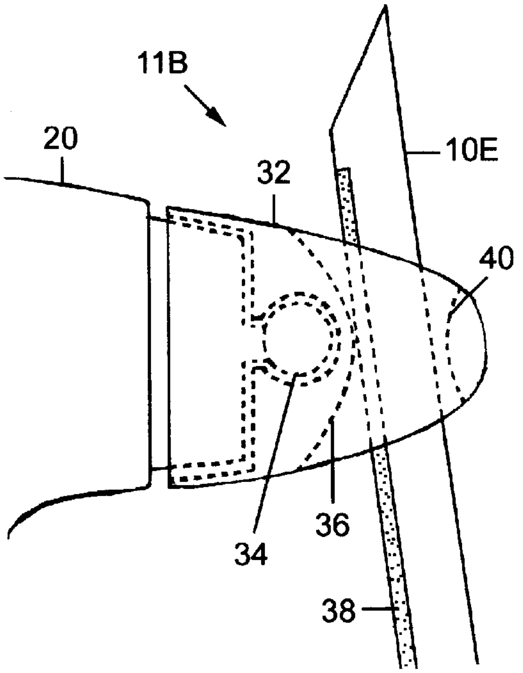
Fig.4B

LEVERAGE ACCESSORY FOR POWER DRILLS

CROSS REFERENCE TO RELATED APPLICATION

This application is entitled to the benefit of Provisional Patent Application Ser. No. 60/179673, filed Feb. 2, 2000.

BACKGROUND—Field of Invention

The present invention relates generally to electric power drills, particularly hand-held electric power drills. More particularly the present invention relates to devices for facilitating the use of hand-held electric power drills, and still more particularly to devices which use mechanical advantage to facilitate the use of hand-held electric power drills

BACKGROUND—Description of Prior Art

Though power drills apply the force to turn the drill bit, the force required to push the drill bit along its longitudinal direction into the object to be drilled is provided by the user. Application of the required forces can be ergonomically difficult, straining and tiring, and result in lower productivity, higher stress and higher cost.

Electricians and plumbers in the construction trades regularly bore holes in studs and joists in order to slide wires and pipes through them. The holes range in size from ½ inch to 4 inches, with ¾ inch and 1 inch most common. A considerable amount of pressure must be consistently applied to the drill motor to bore the hole, and often dozens of holes must be bored during a short period. By the time the actual work of plumbing or wiring can begin, the tradesman is tired from boring labor.

Self-augering drill bits which utilize a center mounted screw device to pull the cutting portion of the drill bit through the material to be bored are available but expensive and difficult or impossible to sharpen. These bits become useless once they strike a nail or screw, breaking off and dulling the cutting tips, requiring their replacement, at high cost. Even self-augering drill bits require a final 'push' to complete drilling. This push results in a lunging forward as the drill bit breaks through. The device of the present invention increases pressure applied as well as increases control during drilling, eliminating the uncontrolled lunging effect.

Furthermore, holes often need to be drilled in difficult to reach spots, such as overhead, making the ergonomics of applying pressure to the drill even more physically awkward, time and energy consuming, and therefore extremely tiring. The force required to push the drill bit through the bore varies with the size of the hole diameter, type and design of the drill bit being used, blade sharpness, drill speed and material being drilled. In all cases, a consistent pressure applied to the drill bit is desirable. The pressure required to be applied to the drill bit throughout the drilling operation varies widely from no pressure applied, to as much as 50 pounds per square inch directed to the drill bit, applied to the longitudinal axis of the drill bit.

Through the years, various techniques of applying force to a portable drill have been developed, specific to the material and object being drilled, location, ergonomics, etc. Several devices have been patented, utilizing a lever to create force. The methods of creating the force and methods of applying the force to the drill motor significantly differ from those of the present invention.

For instance, U.S. Pat. No. 4,168,926, to Rudolph Belcourt, Sep. 25, 1979, requires access to wrap around the object to be drilled, intended for use on pipes. It is not applicable to the object of this invention because of the requirement of clear access to the object being drilled, cumbersome nature of the chains, and longer time required to set up and complete each drilling operation.

U.S. Pat. No. 5,863,158, to George T. Foshee Jr., Jan. 26, 1999, the user must drill a hole to drill a hole, for attaching a bolt and chain to pull against. Though this device could be used in some applications, it is not practical or advisable to drill two holes in order to drill one.

U.S. Pat. No. 5,445,480, to Denys J. Merriman, Aug. 29, 1995, is appropriate for drilling steel beams, where the material being drilled is comparatively thinner than the materials which are intended to be drilled by the present invention, where the hole must be completed with a limited degree of angular movement of the drill bit. This angular movement would be inappropriate for drilling thicker wood, especially multiple layers or beams. The system of pulling from the opposite side of the material being drilled is unable to be used for drilling into interior corners, and studs and joists where accessibility is limited.

U.S. Pat. No. 4,136,579, to Merle W. Robinson, Jan. 30, 1979, (FIG. 9 shows the Robinson device and is provided to clarify the differences between the present invention and this prior art.) Leverage pressure is created by pushing off an adjacent stud or joist using a rolling bearing 32, and linking the lever through a fixed pivot point 22 on the unit housing. The rolling contact point 32 is intended to roll as it is pushed off the adjacent stud. Its use is optimized for specific 16 inch on center stud and joist spacing. It has minimal provision for adjustment of link 18 to allow for variations in stud and joist spacing and requires an external tool to adjust, which is difficult and time consuming. Because of its limited application, difficulty and limits of adjustment, this prior art accessory did not become commercially accepted.

SUMMARY

A leverage accessory for hand-held power drills comprises a lever having a handle at one end and a sharp pointed tip at the other end for plunging into sheathing attached to the stud or joist being drilled. An instantly repositionable, non-slip contact section connects the lever to the drill body to apply force. The device can be adapted to existing drill motors, and may be made integral to drill motor/lever units.

OBJECTS OF THE INVENTION

An object of the present invention is to provide for application of mechanical advantage to a hand-held power drill to allow the operator to drill holes in studs and joists in a more efficient and ergonomically satisfactory manner.

Therefore, it is an object of the present invention to provide an apparatus for applying mechanical advantage to the longitudinal force applied to a drill.

It is another object of the present invention to stabilize the position of the drill motor during the drilling process.

More particularly, it is an object of the present invention to provide a means for attachment of a lever to a drill motor to assist in providing a longitudinal force and stabilization of a drill.

Another object of the present invention is to provide flexible adaptability to each new hole boring application without need for complicated adjustment of the tool.

It is also an object of this invention to make said device instant and intuitive for the user, in order to facilitate rapid setup, execution of the drilling operation and removal for repetitive use in the field.

Advantages include improvement of ergonomics, ease of drilling, speed, safety, control and better accessibility to remote locations for drilling in studs and joists.

BRIEF DESCRIPTION OF THE DRAWINGS

FIG. 3A is a perspective view of the sharp pointed tip.

FIG. 3B is a perspective view of the sharp pointed tip.

FIG. 3C is a perspective view of the sharp pointed tip.

FIG. 4A is a side view of an embodiment of a retrofitted adaptor.

FIG. 4B is a side view of an integrated version of the invention.

REFERENCE NUMERALS IN DRAWINGS

Figure 2A:
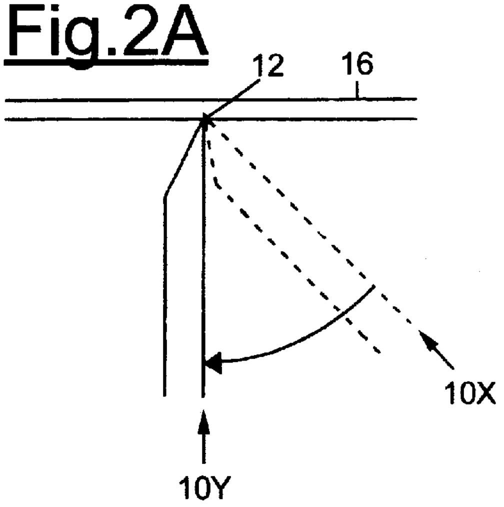
FIG. 2A is a side view showing the angular range of the lever during each stroke.

Part Name
10 lever
10A square tubing lever
10B round tubing lever
10C solid lever
10D notched lever
10W longitudinal movement
10X lever position at start of drilling process
10Y lever position at completion of stroke
10Z 360 degree movement concentric to the longitudinal axis of the drill bit
11A retrofit pistol grip drill/lever accessory
11B integrated pistol grip drill/lever accessory
11C universal lever accessory
11D integrated right angle drill/removable lever unit
11E integrated right angle drill/stowable lever unit
11F retrofit right angle drill/lever accessory
12 Sharp pointed tip
12A sharp multiple tined tip of square tubing lever
12B sharp multiple tined tip of solid lever
12C sharp spoon shaped tip of round tubing lever
14A ergonomic handle
14B contoured handle
14C stowable handle
14D angled ergonomic handle
16 sheathing
18 adaptor
20 hand held electric power drill
21 trigger power switch
22A paddle drill bit
22B self-augering drill bit
22C hole saw
24 stud, joist or beam to be drilled
26 load bearing pin
28 non-slipping load bearing notches
30 retainer pin
32 integrated adaptor
34 swiveling knuckle
36 elastomeric compound
38 load bearing section of lever
40 retainer portion of adaptor
42 stamped steel, fixed head adaptor
44 stamped steel contact area increaser
46 velcro fastening strap
48 stamped steel fixed adaptor base
50 stamped steel swiveling head
52 fastening rivet
54 plastic molded fixed adaptor base
56 plastic molded swiveling head
58 clip-on fixed adaptor
60 friction fit ears
62 adhere-on adaptor
64 adhesive strips
66 electric cord
68 right angle power differential mechanism
70 ergonomically placed power switch
72 ergonomically designed handgrip
74 lever storage trough
76 retainer section
78 right angled drill motor
80 adaptor to right angle drill motor
82 adaptor left half shell
84 adaptor right half shell
84A hook
84B catch
84C elastomeric compound
84D slotted ear
86 square holed ear
88 bolt
90 washer
92 wingnut
94 aperture
96 retainer pin

DETAILED DESCRIPTION OF THE INVENTION

Figure 1A:
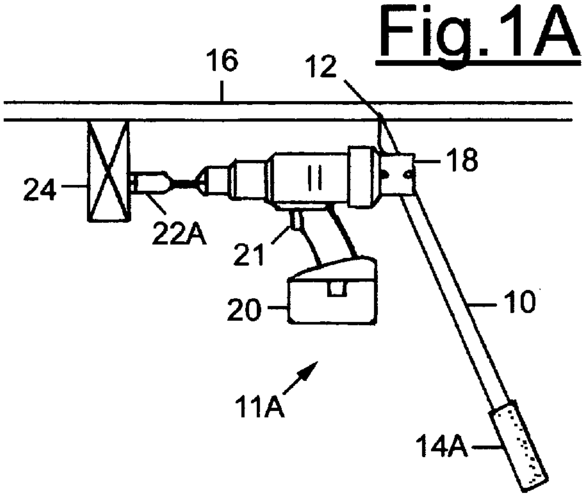
FIG. 1A is a side view showing the initial stage of the drilling operation.
Figure 1B:
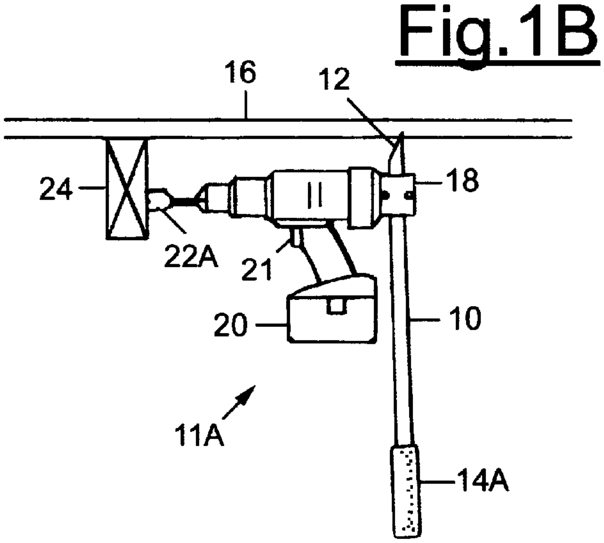
FIG. 1B is a side view showing the end of the lever's stroke during the drilling operation.
Figure 2B:
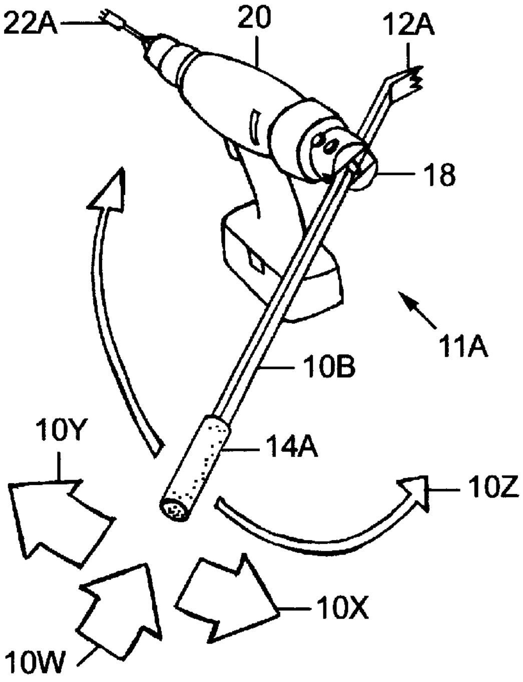
FIG. 2B is a perspective view of the adapted drill/lever unit.

FIG. 1A is a side view of a typical pistol grip, hand-held electric power drill 20, with a lever 10 attached by means of an adaptor 18. The drill/lever accessory assembly 11A is shown in place in the initial position for drilling a stud or joist 24 with a drill bit 22. A handle 14 is located at one end of lever 10, and at the opposite end a sharp pointed tip 12 is plunged into sheathing, plywood, floorboards, or drywall 16. FIG. 1B represents components identical to FIG. 1A, and shows the assembly at the finish of the leverage stroke. FIG. 2A is a side view of lever 10, and shows the preferred range of angular travel of lever 10, where 10*x* is an initial angle of 45 degrees, and 10Y is the final stroke angle of 90 degrees. FIG. 2B is a perspective view of assembly 11A where lever 10 is connected to drill motor 20 by adaptor 18, and is free to rotate on an axis 10Z concentric to the longitudinal axis of drillbit 22. A leverage moment arm 10Y represents the leverage creating movement of lever 10. Free longitudinal movement 10W of lever 10 allows the plunging operation and intuitive repositioning of the lever to the drill motor to take place. Solid lever 10B with sharp tip 12A is shown in this application. FIG. 3A is a close up, perspective view of a sharp, multiple tined tip 12A of square tubing lever 10A.

FIG. 3B is a close up, perspective view of a sharp, multiple tined tip 12B of solid lever 10B.

Figure 5C:
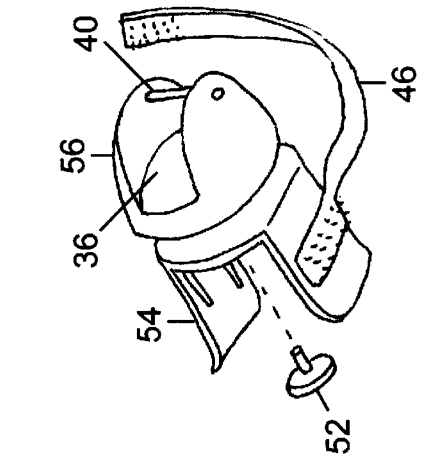
FIG. 5C is a perspective view of a plastic swiveling adaptor.
Figure 5B:
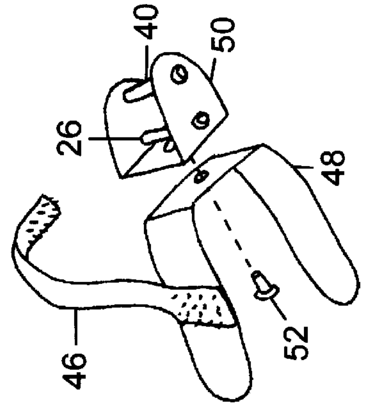
FIG. 5B is a perspective view of a swiveling stamped steel adaptor.
Figure 5E:
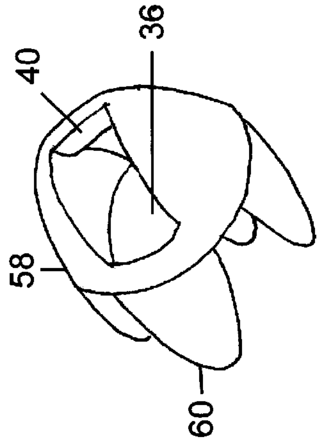
FIG. 5E is a perspective view of a plastic adaptor.
Figure 5A:
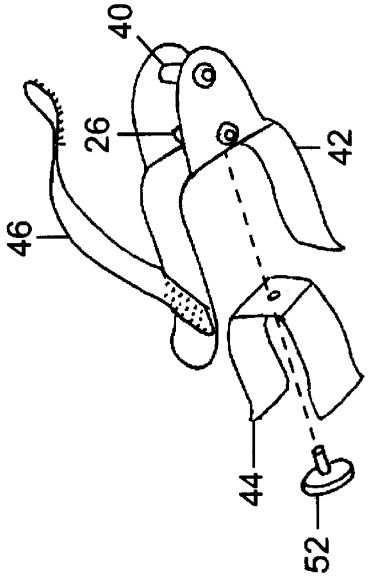
FIG. 5A is a perspective view of a fixed stamped steel adaptor.
Figure 5D:
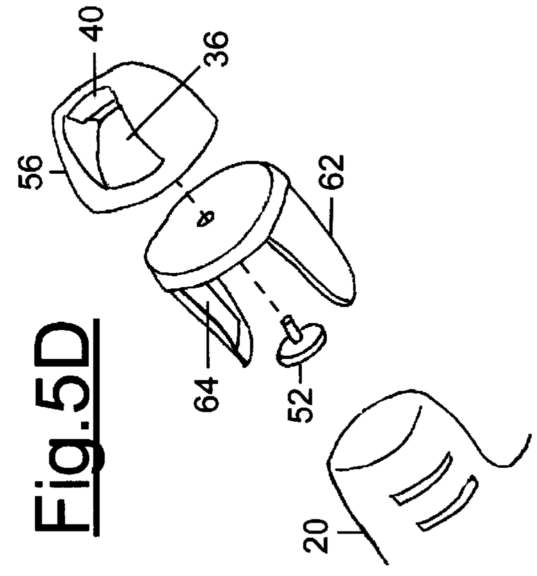
FIG. 5D is a perspective view of a plastic swiveling adaptor.
Figure 6B:
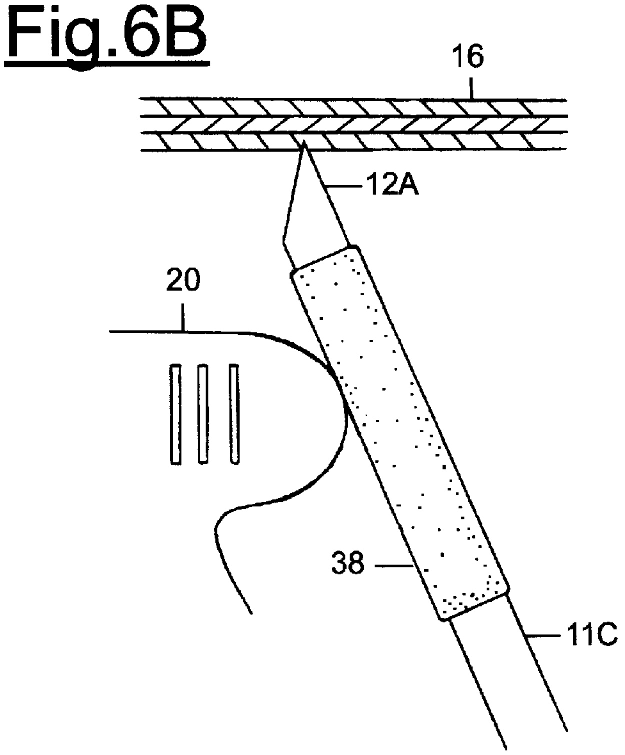
FIG. 6B is a side view of the universal embodiment at the beginning of the stroke.
Figure 6A:
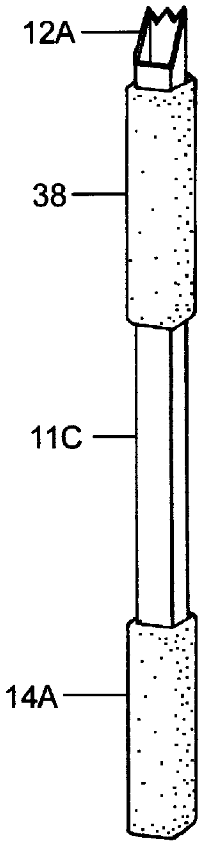
FIG. 6A is a perspective view of a universal embodiment of the invention.
Figure 6C:
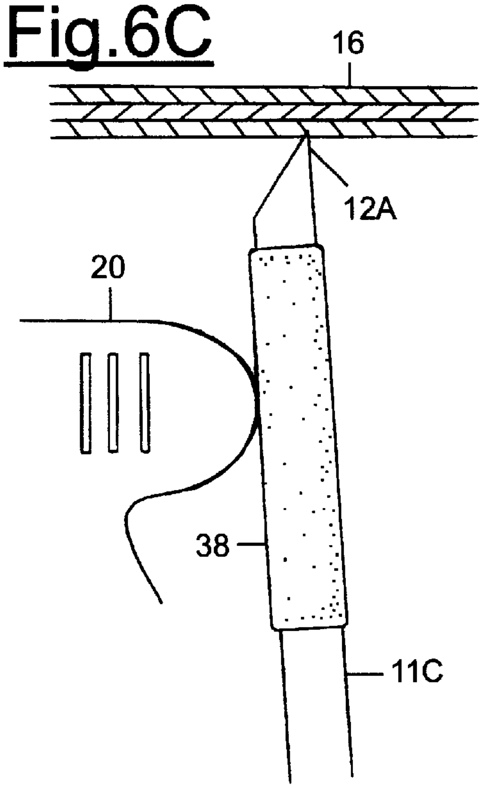
FIG. 6C is a side view of the universal embodiment at the end of a stroke.
Figure 7A:
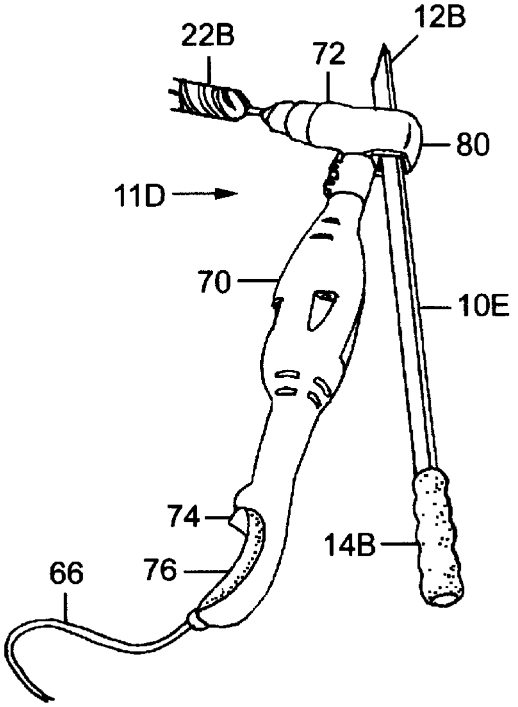
FIG. 7A is a perspective view of an integrated drill motor and lever with a removable lever.
Figure 7B:
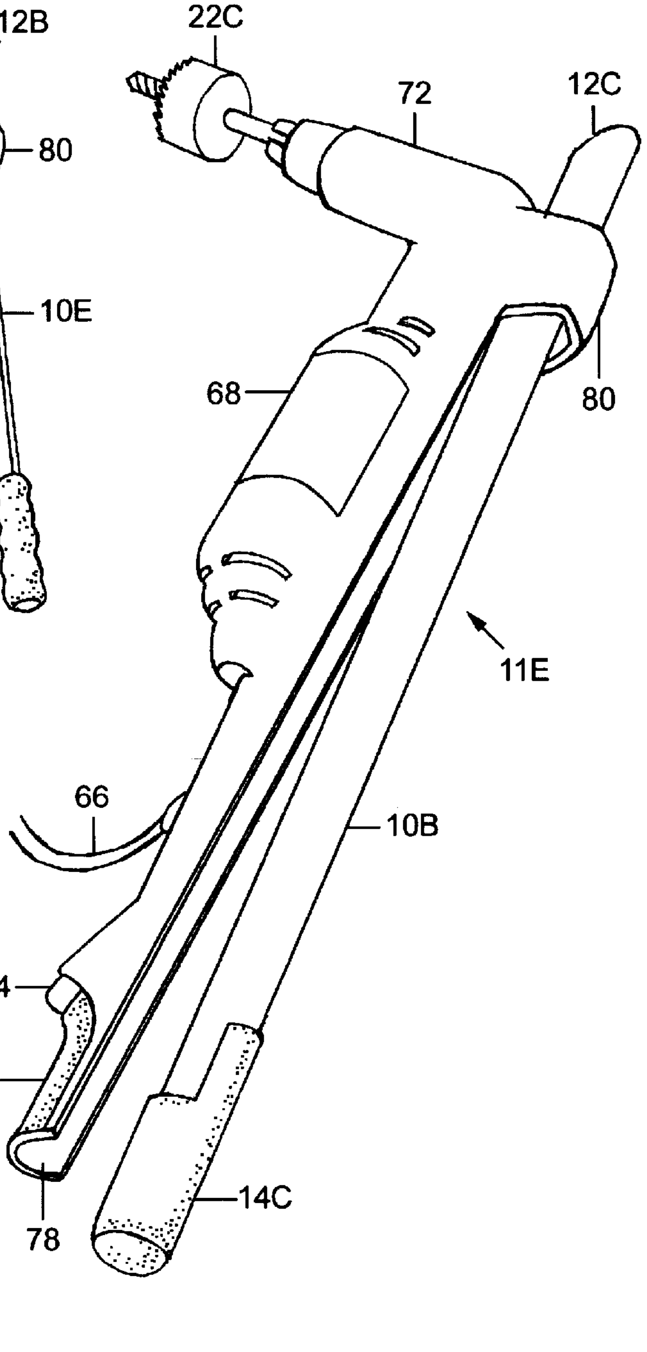
FIG. 7B is a perspective view of an integrated drill motor and lever with a stowable lever.
Figure 8A:
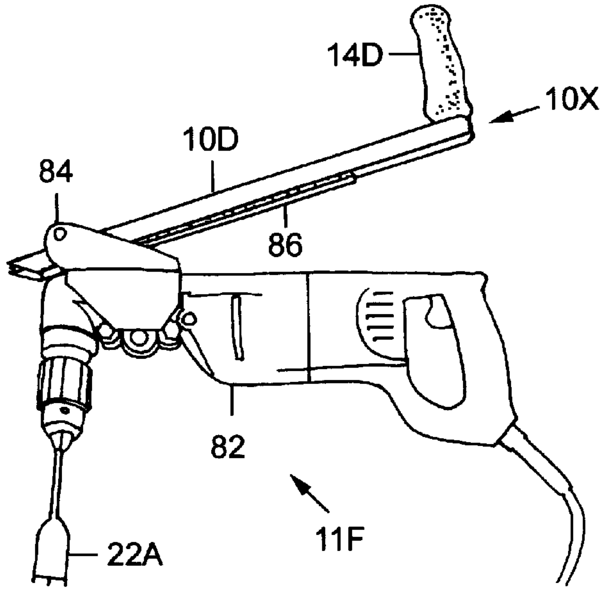
FIG. 8A is a perspective view of another embodiment of the invention adapted to a commercial right angle drill motor unit, at the beginning of the stroke.
Figure 8B:
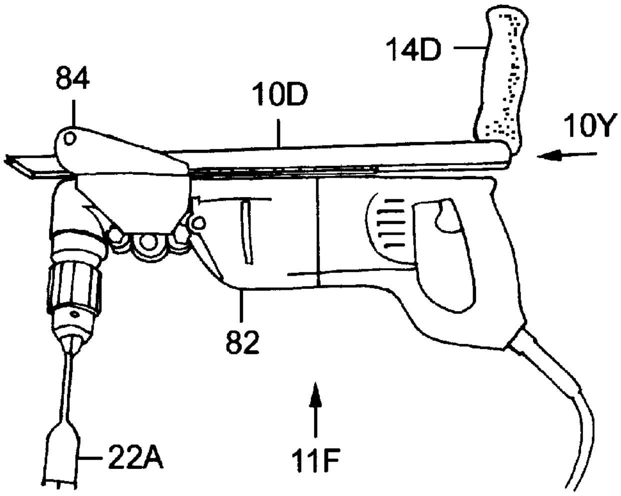
FIG. 8B is a perspective view representing the adapted commercial drill motor unit at the completion of its stroke.
Figure 8C:
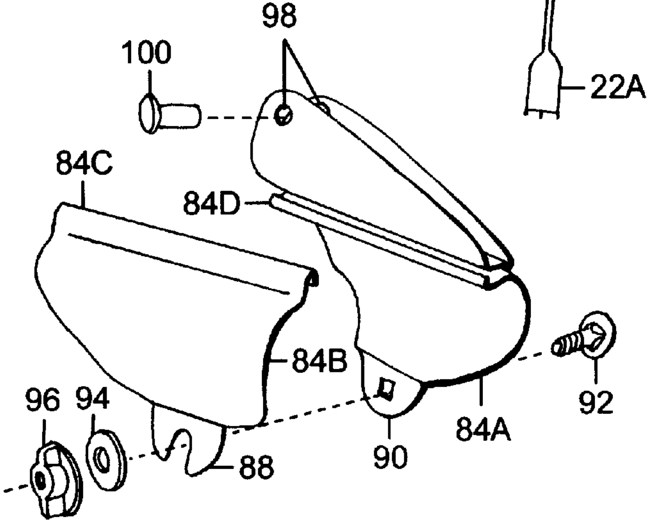
FIG. 8C is an exploded view of the adaptor for the heavy duty drill motor accessory.
Figure 9:
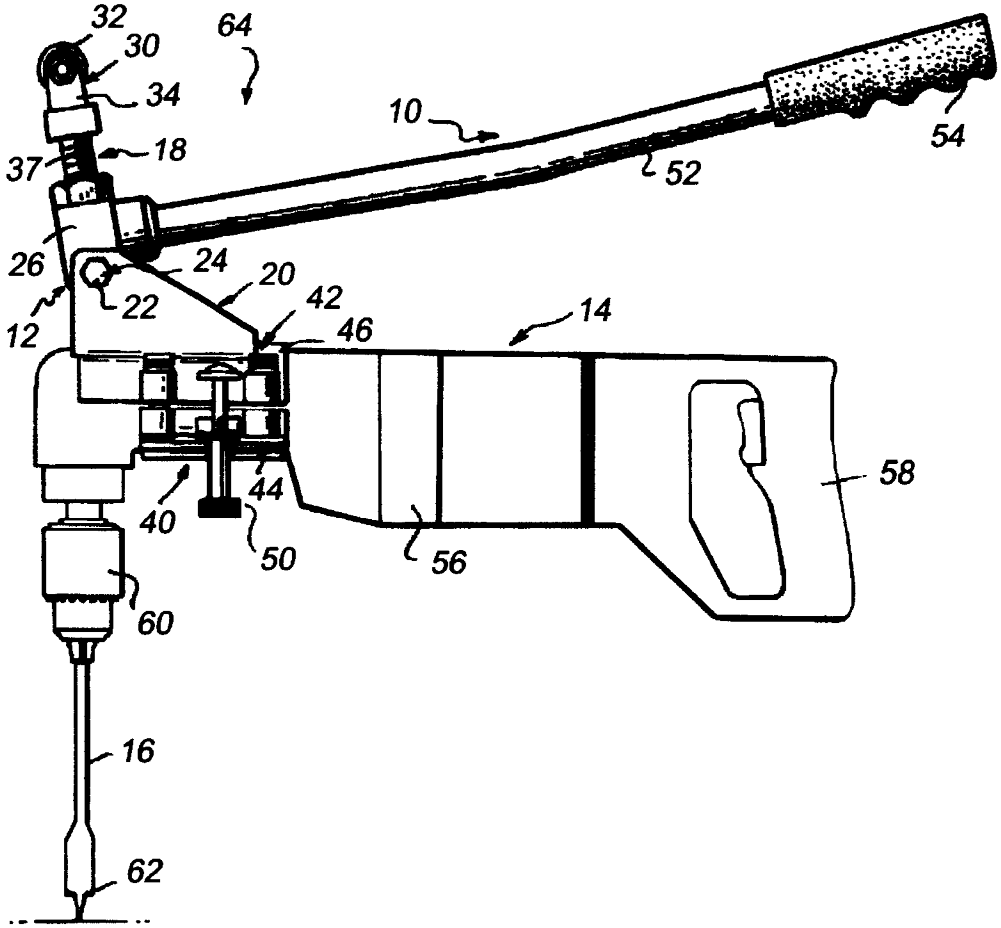
Fig. 9 Prior Art
FIG. 9 shows the Robinson Prior Art device.

FIG. 3C is a close up, perspective view of a sharp, spooned shaped tip 12C of round tubing lever 10C. While FIGS. 3A, 3B and 3C depict the preferred embodiments for sharp tip 12, many applications of tip designs are usable. FIG. 4A is a side view of assembly 11A showing a second embodiment for providing non-slip connection of a lever 10D to drill motor 20 through load bearing connecting pin 26 of adaptor 18 and non-slipping load bearing notches 28 of lever 10D. A retainer pin 30 of adaptor 18 keeps lever 10D from separating from adaptor 18 during use. FIG. 4B is a side view of an integrated embodiment of the present invention where an integrated adaptor 32 is connected to drill motor 20 by a swiveling knuckle 34. Another embodiment for providing a non-slip connection between adaptor 32 and lever 10E utilizes an elastomeric compound 38, mated to lever 10E to reduce slippage during drilling. It should be noted that elastomeric compound 38 may be applied to lever 10E, or applied to adaptor 32 at contact point 36. Operation will be satisfactory in either case. A retainer portion 40 is built into adaptor 32 to retain lever 10E during use. FIGS. 5A through 5E represent various embodiments to facilitate retrofitting adaptors to existing pistol grip, hand-held power drill motors. It should be noted that a wide range of applications of the present invention are usable, still within the scope of the invention. FIG. 5A is a perspective view of a fixed head, stamped steel embodiment of an adaptor 42 which uses a velcro fastening strap 46 and a stamped steel area increaser 44 to retrofit the adaptor to existing pistol grip hand-held power drill 20. Load bearing pin 26 and retainer pin 40 maintain position of lever 10D. A fastening rivet 52 attaches the two steel adaptor sections. FIG. 5B is similar to the embodiment in FIG. 5A with the exception of the addition of a swiveling head 50 and fastening rivet 52. FIG. 5C depicts a plastic molded version of the embodiment in FIG. 5B, where load bearing surface 36 is integral to the adaptor head 56. FIG. 5D depicts an iteration of the adaptor in FIG. 5C where adhesive strips 64 are used to attach a base 54 to drill motor 20. Retaining section 40 is shown integrated into swiveling head 36. FIG. 5E represents an attaching method using friction-fit ears 60 to attach clip-on adaptor 58 to drill motor 20. FIG. 6A is a perspective view of an embodiment of a universal leverage accessory 11C. Its length may be from a minimum of 12 inches, to a maximum of 36 inches from end to end, preferably 24 inches in total length. Elastomeric compound 38 in the preferred example is positioned in a location beginning one inch from the sharp tip 12A and extending along lever 11C to a location approximately 12 inches from sharp tip 12A, in order to provide a non-slip contact area for drill motor 20. The span of non-slip material allows use of the accessory for a wide range of hole positions on various width studs, joists and beams. Though the accessory is operable without it, ergonomic handle 14A utilizes an elastomeric covering to ease fatigue of the hands and improve grip of lever 11C. FIG. 6B is a side view that depicts elastomeric compound 38 of lever 11C in contact with drill motor 20. Sharp point 12A is engaged with sheathing 16 so as to provide a fulcrum point for the leveraging process. Lever 11C is shown at a mid point during the leveraging stroke. FIG. 6C is a side view showing the preferred angle at the completion of the leveraging stroke, approximately 90 degrees to sheathing 16. FIG. 7A is a perspective view of a heavy duty, integrated drill motor and removable lever 11D. Removable lever 10E applies leverage to the center axis of drill bit 22B through a right angle power differential mechanism 72. Retainer section 80 keeps lever 10E from separating from assembly 70 during operation. An ergonomically placed power switch 74 is conveniently located in an ergonomically designed handgrip 76, for effective handling and ease of use. A power cord 66 electricity to the unit for high power drilling. FIG. 7B is a perspective view of a heavy duty, integrated drill motor and stowable lever 11E. The embodiment shown is functionally the same as drill motor/lever assembly 70, applying leverage pressure through right angle differential 72 to drill bit 22C. In addition, it provides a lever storage trough 78 to accommodate storage of lever 10B for times when the drill motor is used without need for the integrated lever 10B. This novel storage system provides the operator with a multiple task tool for flexibility in the field. The relationship between the lever 10B and retainer section 80 is such that sharp tip 12C is covered when lever 10B is stored, protecting the operator, and the sharp tip 12C. FIG. 8A is a side view of a heavy duty right angle drill motor 82, lever 10D and adaptor 84 which comprise drill motor/leverage accessory 11F. This embodiment functions in the same way as 10D of FIG. 7A. It is shown with its lever position at the start of the drilling process 10X. Lever 10D utilizes an elastomeric compound 86 along its length to provide a nonslip contact point with the drill motor 82. The non-slip surface can be located on drill motor 82 at the contact point with lever 10D and work satisfactorily as well. Handle 14D is angled ergonomically to reduce user fatigue. In this application, the angle is approximately 80 degrees from measured the longitudinal axis of lever 10D. The angle is the symmetrical opposite of the drill motor being adapted to. FIG. 8B is a side view identical to FIG. 8A except lever 10D is shown in its position at completion of the levering stroke 10Y. FIG. 8C is a perspective view of adaptor 84. Apertures 98 provide location for retaining pin 100 to keep lever 10D from separating from adaptor 84 during operation. Adaptor left half shell 84A and adaptor right half shell 84B connect at longitudinal points 84C and 84D to lock together around the neck of drill motor 82, as shown in FIG. 8B. Orifices in ears 88 and 90 allow bolt 92 to fasten the half shells together, making a solid yet easily removable connection between drill motor 82 and adaptor 84. Adaptor 84 is depicted and described being made from stamped and welded sheet steel. Other versions are producible, keeping within the scope of the present invention. Drill motor 82 in FIGS. 8A and 8B is manufactured by Milwaukee Electric Tool Corporation and is a widely accepted, versatile construction tool. Adaptors may be made to retrofit and accommodate various right angle drill motors made by other manufacturers while remaining within the scope of the present invention.

DETAILED DESCRIPTION OF OPERATION

Drilling holes in studs, joists and beams without the present invention in most cases requires the operator to stand behind the drill motor, and strike a triangulated posture, whereby the feet are the base of the triangle, and the third point of the triangle is focused on the drill bit. Pressure is then applied through the triangulated stance to apply pressure to the drill motor to drive the drill bit through its bore. Often, the preferable location for the hole to be drilled is out of the triangulated stance zone. Without the leverage accessory system of the present invention, the resulting hole location is often a compromise between what should be and what can be. The present invention addresses this scenario in the real world of construction. The versatility of the device can be seen by observation of the function of its parts. The embodiments depicted in FIGS. 1A through 5E all function in a straightforward and simple manner. They are leverage accessories designed for use with pistol grip, hand-held power drill motors, by use of custom-made adaptors. As shown in FIGS. 1A through 2B, lever 10 is connected to drill motor 20 by adaptor 18. The ergonomics envolved in use of this type of hand-held drill motor 20 specifically differ from ergonomics of right angle drill motors 82, and require the lever assembly to swivel in relation to the longitudinal axis 10Z of the drill bit 22A, because of placement of the hands during use. This swiveling allows a wide range of ergonomic positioning for the operator, for flexibility of use in the field. The accessory is usable and preferable anywhere sheathing, plywood, drywall, etc. 16 is attached to the stud or joist to be drilled 24. A small mark is left as result of use of the lever accessory, from the impaling action 10W of sharp tip 12. Insignificant in size, it is always on the inside or underneath a wall or floor. It is the insignificance of this mark that makes the accessory so valuable in the field. The first step in use of adapted lever 11A is to place the tip of drill bit 22 where the hole is desired on the stud or joist 24 to be drilled. Holding power drill motor 20 in one hand, it is aligned to provide the desired angle of penetration into stud 24, typically 90 degrees. With lever 10 handle 14 in the other hand, the lever is slid rapidly through adaptor 18 so as to ram and impale 10W sheathing 16 to create a temporary fulcrum for the leverage action. The lever 10 is then pressed firmly to the sheathing 16, and firmly to the drill motor 20 through adaptor 18. The operator then presses the trigger power switch 21 to turn drill bit 22. Drill bit 22 then bores through stud 24 with only a fraction of the pressure required when drilling without the mechanical advantage of the leverage accessory 11A. Depending on the thickness of stud 24, several strokes 10X to 10Y of lever 10 may be required to complete the bore. Standard two by four, six, eight, etc. materials can be bored in one stroke 10X to 10Y. The ease and intuitive quality of the accessory allows repeated repositioning of lever 10 and sharp point 12 without stopping rotation of drill bit 22. The application of consistent pressure is desirable and easily learned. New operators can become skilled in use of the lever accessory because of its simplicity and intuitive nature.

FIGS. 3 A, B and C and 5A through E represent various embodiments of the leverage accessory without regard to which displayed is most preferable. Thus the scope of the invention should be determined by the appended claims and their legal equivalents, rather than the examples given.

Operation of the universal, unattached embodiment of lever accessory 11C is presented in FIGS. 6A, B,and C. Because it does not physically attach to drill motor 20, unattached version 11C is usable with all pistol grip hand-held power drills 20. Operation of unattached lever 11C is identical to the previously described accessory 11A, with the following exceptions. Because no adaptor 18 is used, alignment of lever 11 in relation to drill motor 20 must be made approximate in each drilling operation. Gently resting lever 11C against the rear portion of drill motor 20 in alignment with the central axis of drill bit 22 allows predetermination for location of 11C for impalement 10W into sheathing 16. It is an intuitive and easy step, with satisfactory margin for readjustment of alignment during the drilling process. Elastomeric compound 38 allows a wide range of positioning of drill motor 20 along its length, to allow for a wide range of locations for hole drilling on joists 24 from two inches wide to twelve inches wide.

FIGS. 7A, 7B, 8A, 8B, and 8C show examples to clarify operation of the right angle hand-held power drill motor with leverage accessory embodiments 11D, E and F. Operation is similar to that of the other embodiments shown as 11A, B and C, with the following exceptions. Because of the high torque associated with typical right angle drills 82, it is preferable to utilize a stationary, non-swiveling head adaptor 84 to assist in controlling kickback torque associated with binding of drill bit 22A in the bore being drilled in stud 24. Applications may exist where a swiveling head may be desirable for this embodiment as well. An angled handle 14D is preferable for lever 10D to optimize ergonomics in this application, and additional embodiments 10A, B, C, D, E, and others not shown will be suitable as well.

FIGS. 8A, B and C depict an adaptor accessory optimized for a specific right angle drill motor, manufactured by Milwaukee Electric Tool Corporation. An advantage of angled handle 14D in this case is its use for balancing drill motor 82 before the drilling operation begins. By resting the base of the forearm on handle 14D, and placing the hand of that same forearm under adaptor 84, an ergonomically desirable condition exists. Control of the drill motor and lever accessory unit is increased, and allows accurate placement of drill bit 22A in the location of choice for drilling stud 24. The same operation is used for removal of drill motor 82 and drill bit 22A from the bore after completion of the hole.

FIG. 8C is an exploded view of adaptor 84, showing a preferred embodiment when manufactured using stamped steel components. It is divided into two main sections 84A and 84B, with hook 84C and catch 84D providing easy and quick removal and attachment to drill motor 82. Additional systems may be usable for adaptor 84, remaining within the scope of the invention.

GENERAL DESCRIPTION OF INVENTION

A lever of a length from 12" to 36" to apply pressure for hole boring with hand operated power drills.

A sharp plunging tip on the lever, suitable for providing a temporary and instantly repositionable fulcrum point without slipping in its connection with the impaled material and without causing prohibitive damage during the leveraged drilling operation.

A system that allows instant adjustment along the longitudinal axis of the lever for positioning of the contact point of the lever relative to the drill body as it advances through the drilling process, and to allow for variations of the lever in relation to the drill motor.

Custom adapted versions provide a slip-joint between lever and drill, maintaining position of the drill motor, slip-joint and lever in relation to each other as one unit.

Leverage pressure is applied to the central axis of the drill bit. Infinitely variable pressure control is preferable. The ability to infinitely vary pressure applied from a minimum of zero to a maximum force capable of stopping the drill motor from turning is more preferable. The maximum pressure relates to the power ratings of individual drill motors and the maximum drill bit size for that unit. Integrated lever and drill motor units are most preferable, wherein a negative pressure may be applied, to retract the drill bit from the bore.

An ergonomically designed handle. The handle can be shaped to fit the operator's hand in its position during the drilling process, and may have a bulbous end to provide surface area as a cushion for the operator's hand to absorb the reactive forces of impact in the impaling step.

Methods of Attaching the Lever to the Drill

There are several embodiments of the invention.

An integrated leverage device and drill motor, ergonomically designed for simplicity and ease of use. This version will be an improvement over pistol-grip, t-handle and 90 degree angled drill units by its ability to provide the benefits of the leverage device with ergonomic design and placement of switches, and overall balance of the whole unit optimized for this drilling application. A heavy duty version of the integrated unit will be manufactured for commercial applications.

Custom designed, retrofit adaptations of the device, fitted to specific equipment. Examples are bolt-on units for existing 90 degree drill motors and snap or slip-on adapters for t-handle drills. These versions are two piece units, adaptor and lever. The adaptor attaches to the drill, and the lever slides through the adaptor. Provision must be made for non-slipping of the lever at the point of contact with the adaptor. The use of custom designed adaptors to adapt the leverage device to specific drill motors is advantageous in that the tool is simpler to handle. The device is able to be positioned more easily as one unit, and operated without loss of contact of the lever and drill body. By mounting the lever to the drill, correct positioning of the lever to the drill is assured. This is an advantage before, during and after drilling, allowing greater control and smooth transitioning for greater efficiency during repetitive hole boring operations. In certain applications, a swiveling mount is preferred, allowing 360 degree rotational movement of the lever in relation to the longitudinal axis of the drill bit. Pistol grip hand-held power drills are examples of these. The ergonomic parameters of these devices vary with each application.

Universal non-attached lever, a one-piece unit, designed to provide positive non-slipping contact between the drill motor and lever. The contact point of the device is made with a large enough longitudinal area to be adaptable to a plurality of drill motors.

All Versions Will Provide the Following

A lever of a length suitable length to provide a variable pressure, adequate for driving a drill bit through the material to be drilled. An approximate length for the lever is a range between 12" and 36", preferably 24".

A sharp pointed tip on the lever, to be plunged into various materials for the purpose of creating a temporary link as a fulcrum for leverage. The tip may have multiple tines.

A system of contacting the drill housing assembly at a point substantially in line with the drill bit, for the purpose of applying a controlled and appropriate amount of pressure to the bit throughout the drilling operation. Provision will be made to eliminate slippage of the lever at the point of contact with the drill housing centerline. Such provision may be in the form of elastomeric compounds or compressible material such as rubber, adhered at the contact point, or a system of notches and links for the same purpose. The non-slip system will allow for simple, instant and intuitive movement of the lever for repositioning during the drilling operation. The compressible material may be mounted either to the lever or the drill motor or adaptor.

A lever handle, ergonomically designed for repeated use, suitable for applying longitudinal forces for plunging and lateral force for applying side pressure. In some cases, the handle can be mounted at an angle to the lever. It may be covered with a soft elastomeric material, and may have a bulbous end to absorb impact.

CONCLUSION, RAMIFICATIONS AND SCOPE

Accordingly, the reader will see that the leverage accessory for electric power drills of the present invention offers advantages to the operator in several areas.

The present invention is a leverage device appropriate to the functional and ergonomic requirements of hole drilling. Its typical area of use is in residential and commercial construction, for the boring of holes in studs and joists for plumbing and electrical wiring.

A primary advantage of the present invention is ease of drilling, especially in ergonomically difficult situations, such as overhead or in a crawlspace. Its simplicity makes it desirable even in normal drilling locations, providing quicker, easier and better controlled boring.

The device provides consistently smooth control of drilling, while requiring less effort from the operator through the use of leverage principles. Control of the cutting depth is increased, eliminating the forward lunging associated with normal breakthrough as the hole is completed. This increased level of control is desirable for providing the final 'push' needed when using self-feeding drill bits. Reducing the effects of lunging at the time of hole boring completion results in less breakage of wood structure and greater stability for the operator, which is desirable for safety, especially when drilling while standing on a ladder.

An unsafe condition exists with the use of hand-held power drills, especially when drilling large diameter holes, using high torque drill motors. Hand operated drill motors are normally stabilized only by the operator, often in positions where the operator's arms are extended with compromised ergonomic positioning. A condition exists where binding of the drill bit in the hole being bored often results in high torque being applied to the operator that is not expected. Often, a counter-force cannot be applied quickly enough to counteract the unexpected torque. A late response often results in binding of the drill bit in the bore. The result is often personal injury, damage to the drill bit, the material being drilled, or nearby materials.

All embodiments of the present invention stabilize the drill motor during the drilling process. Safety is increased by providing a temporary, fixed positioning of the drill body which automatically reduces the possibility of binding and the effects of binding of the drill bit within the bore. The embodiment of the preferred device designed for heavy duty, high torque right angle power drills, utilizes a laterally stationary mounted lever. This feature, combined with the temporary, stationary placement of the fulcrum, provides superior control of the inherent twisting moments especially dangerous when drilling large holes.

Although the description above contains many specificities, these should not be construed as limiting the scope of the invention but as merely providing illustrations of some of the presently preferred embodiments of this invention. For example, the sharp tip can have multiple tines of various angles; levers can be made of round tubing, square tubing, or solid stock; adaptors can be made of steel, aluminum or plastic; handles can be of various shapes; different lengths may be used for the lever and components, and still be within the scope of the present invention.

I claim:

1. A lever accessory for axially feeding a power drill, comprising:

a chuck on a front end of the power drill for holding a drill bit, and a body portion on the end of the power drill opposite said chuck;

an adapter on the body portion;

a substantially straight lever having a handle on one end, a sharp, pointed tip on the other end, said pointed tip for impaling a portion of the nearby work environment to provide a temporary fulcrum, and an intermediate portion located between the tip and handle, said intermediate portion engaging and pivoting on the adapter when the pointed tip is impaled and as the handle is moved by an operator in order to feed the drill bit axially.

2. The lever accessory as set forth in claim 1, wherein the adapter consists of an elastomeric compound.

3. The lever accessory as set forth in claim 1, wherein the intermediate portion of the lever has an elastomeric coating.

* * * * *